(12) United States Patent
Prather et al.

(10) Patent No.: US 10,941,869 B2
(45) Date of Patent: Mar. 9, 2021

(54) DUAL LOCK FLOW GATE

(71) Applicants: Joshua Terry Prather, Acton, CA (US); Lawrence Osborne, Acton, CA (US)

(72) Inventors: Joshua Terry Prather, Acton, CA (US); Lawrence Osborne, Acton, CA (US)

(*) Notice: Subject to any disclaimer, the term of this patent is extended or adjusted under 35 U.S.C. 154(b) by 0 days.

(21) Appl. No.: 16/009,022

(22) Filed: Jun. 14, 2018

(65) Prior Publication Data

US 2019/0331235 A1    Oct. 31, 2019

Related U.S. Application Data

(63) Continuation-in-part of application No. 15/962,280, filed on Apr. 25, 2018.

(51) Int. Cl.
| | |
|---|---|
| *E21B 34/08* | (2006.01) |
| *F16K 3/06* | (2006.01) |
| *F16K 15/02* | (2006.01) |
| *E21B 34/12* | (2006.01) |
| *F16K 17/04* | (2006.01) |
| *F16K 1/20* | (2006.01) |
| *B64D 37/10* | (2006.01) |
| *G01M 3/02* | (2006.01) |
| *F16K 17/196* | (2006.01) |
| *F16K 43/00* | (2006.01) |
| *F16L 55/11* | (2006.01) |
| *E21B 43/12* | (2006.01) |
| *F16K 15/03* | (2006.01) |

(Continued)

(52) U.S. Cl.
CPC ............. *F16K 3/06* (2013.01); *E21B 34/08* (2013.01); *E21B 34/12* (2013.01); *F16K 15/02* (2013.01); *B64D 37/005* (2013.01); *B64D 37/10* (2013.01); *E21B 43/121* (2013.01); *E21B 2200/05* (2020.05); *F16K 1/20* (2013.01); *F16K 15/03* (2013.01); *F16K 17/0406* (2013.01); *F16K 17/0473* (2013.01); *F16K 17/196* (2013.01); *F16K 17/26* (2013.01); *F16K 43/00* (2013.01); *F16L 55/11* (2013.01); *G01M 3/022* (2013.01)

(58) Field of Classification Search
CPC ........ E21B 34/08; E21B 34/12; E21B 43/121; F16K 17/0406; F16K 17/196; F16K 17/0473; F16K 17/26; F16K 15/03; F16K 43/00; F16K 1/20; F16L 55/11; B64D 37/10; B64D 37/005; G01M 3/022
See application file for complete search history.

(56) References Cited

U.S. PATENT DOCUMENTS 2,048,088 A * 7/1936 Wagner .................. F16K 15/03
137/519
2,654,388 A * 10/1953 Glass ...................... F16K 15/03
137/115.18

(Continued)

*Primary Examiner* — Matthew W Jellett
*Assistant Examiner* — Christopher D Ballman
(74) *Attorney, Agent, or Firm* — Paul D. Chancellor; Ocean Law

(57) ABSTRACT

A dual lock flow gate includes a valve with a flapper which may be fixed and/or locked in various positions for example to prevent fluid flow in the production string during lowering of the production string in the casing by blocking flow in the production string with the dual lock flow gate or for example to prevent rotation of the pump motor by preventing fluid flow in the production string.

7 Claims, 11 Drawing Sheets

(51) Int. Cl.
*F16K 17/26* (2006.01)
*B64D 37/00* (2006.01)

(56) References Cited

U.S. PATENT DOCUMENTS

| | | | | |
|---|---|---|---|---|
| 2,735,498 A * | 2/1956 | Muse | ...... | E21B 21/10 137/71 |
| 2,812,820 A * | 11/1957 | Nelson | ...... | E21B 21/10 137/508 |
| 3,016,914 A * | 1/1962 | Keithahn | ...... | E21B 21/10 137/454.2 |
| 3,311,078 A * | 3/1967 | Hendry | ...... | B63C 7/12 114/50 |
| 3,494,417 A * | 2/1970 | Fredd | ...... | E21B 34/105 166/321 |
| 3,955,592 A * | 5/1976 | Guyton | ...... | F16K 15/03 137/329 |
| 4,117,860 A * | 10/1978 | Carlin | ...... | A62C 33/00 137/513.5 |
| 4,154,303 A * | 5/1979 | Fournier | ...... | E21B 34/06 166/317 |
| 4,223,697 A * | 9/1980 | Pendleton | ...... | F16K 15/03 137/527.8 |
| 4,272,640 A * | 6/1981 | Baumbach | ...... | E03F 7/04 137/110 |
| 4,291,722 A * | 9/1981 | Churchman | ...... | E21B 21/10 137/496 |
| 4,425,965 A * | 1/1984 | Bayh, III | ...... | E21B 23/02 166/106 |
| 4,597,449 A * | 7/1986 | Keeney | ...... | E21B 34/14 166/318 |
| 4,694,903 A * | 9/1987 | Ringgenberg | ...... | E21B 34/103 166/250.08 |
| 4,815,492 A * | 3/1989 | Tedei | ...... | E03F 7/04 137/362 |
| 5,056,548 A * | 10/1991 | Mills | ...... | F16K 15/03 137/15.18 |
| 5,156,183 A * | 10/1992 | Scaramucci | ...... | F16K 15/033 137/454.2 |
| 5,230,390 A * | 7/1993 | Zastresek | ...... | E21B 25/00 175/232 |
| 5,584,315 A * | 12/1996 | Powell | ...... | E03F 7/04 137/15.18 |
| 5,871,051 A * | 2/1999 | Mann | ...... | E21B 43/121 166/377 |
| 6,227,299 B1 * | 5/2001 | Dennistoun | ...... | E21B 34/06 137/515 |
| 6,328,109 B1 * | 12/2001 | Pringle | ...... | E21B 23/006 166/321 |
| 6,397,874 B1 * | 6/2002 | Featheringill | ...... | E03F 1/006 137/112 |
| 6,446,665 B2 * | 9/2002 | Coscarella | ...... | F16K 15/03 137/409 |
| 6,557,645 B1 * | 5/2003 | Ringer | ...... | A62C 35/62 137/516.25 |
| 6,779,947 B1 * | 8/2004 | Buchanan | ...... | E02B 7/40 405/100 |
| 7,152,622 B2 * | 12/2006 | Scaramucci | ...... | F16K 15/033 137/527.2 |
| 7,673,695 B2 * | 3/2010 | Deurloo | ...... | A62C 35/68 137/527.4 |
| 7,762,336 B2 * | 7/2010 | Johnson | ...... | E21B 34/066 166/332.7 |
| 7,784,489 B2 * | 8/2010 | Paulin | ...... | F04D 9/008 137/527.2 |
| 8,079,417 B2 * | 12/2011 | Wegener | ...... | E21B 23/01 166/105 |
| 8,567,431 B2 * | 10/2013 | Hapner | ...... | E03F 7/04 137/315.16 |
| 8,955,543 B2 * | 2/2015 | Groesbeck | ...... | E21B 21/10 137/513 |
| 9,470,063 B2 * | 10/2016 | Stewart | ...... | E21B 34/14 |
| 9,494,015 B2 * | 11/2016 | Vick, Jr. | ...... | E21B 34/101 |
| 9,518,445 B2 * | 12/2016 | Noske | ...... | E21B 34/06 |
| 9,562,418 B2 * | 2/2017 | Osborne | ...... | E21B 34/08 |
| 9,562,419 B2 * | 2/2017 | Fleckenstein | ...... | E21B 34/08 |
| 10,030,644 B2 * | 7/2018 | Osborne | ...... | F04B 47/00 |
| 10,100,601 B2 * | 10/2018 | King | ...... | E21B 33/134 |
| 10,201,723 B2 * | 2/2019 | Deurloo | ...... | A62C 35/68 |
| 2002/0174988 A1 * | 11/2002 | Szarka | ...... | E21B 21/103 166/325 |
| 2009/0211753 A1 * | 8/2009 | Emtiazian | ...... | E21B 43/128 166/250.03 |
| 2018/0051532 A1 * | 2/2018 | Smith | ...... | E21B 33/134 |
| 2019/0010782 A1 * | 1/2019 | Parkins | ...... | E21B 43/128 |

* cited by examiner

FIG. 1A
FIG. 1B
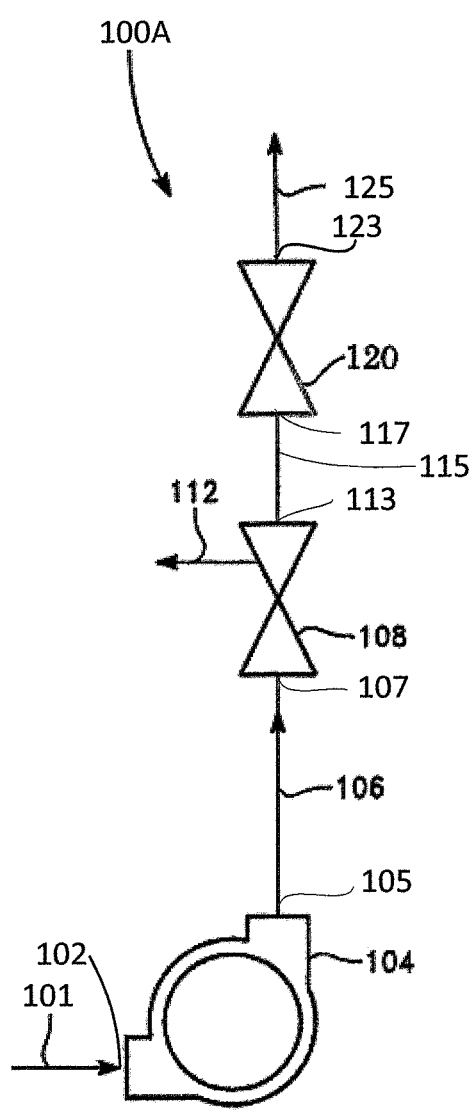
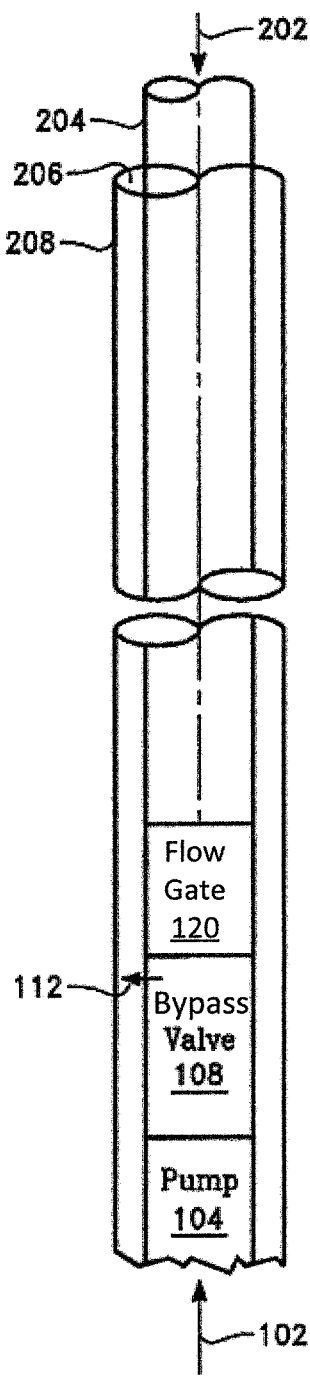

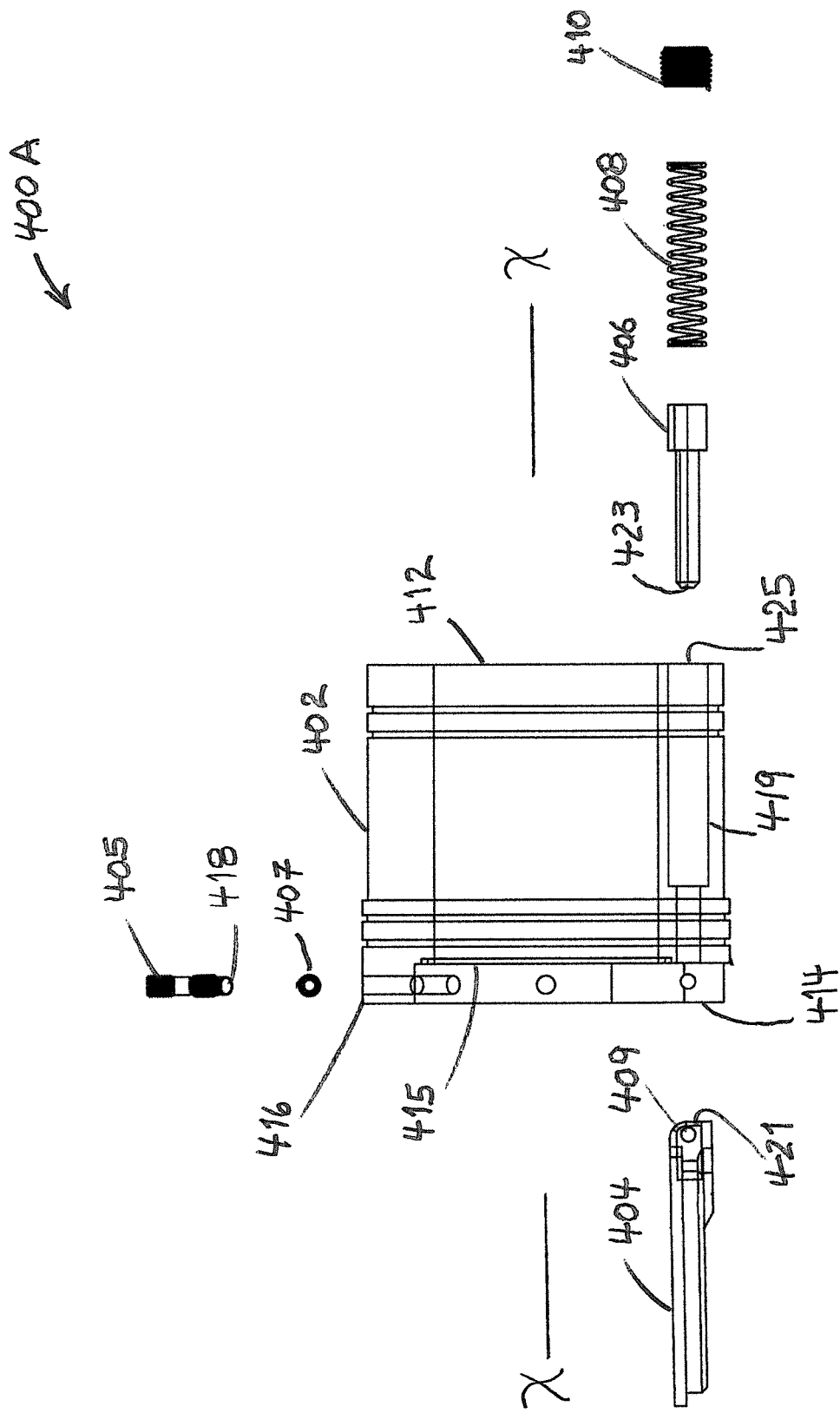

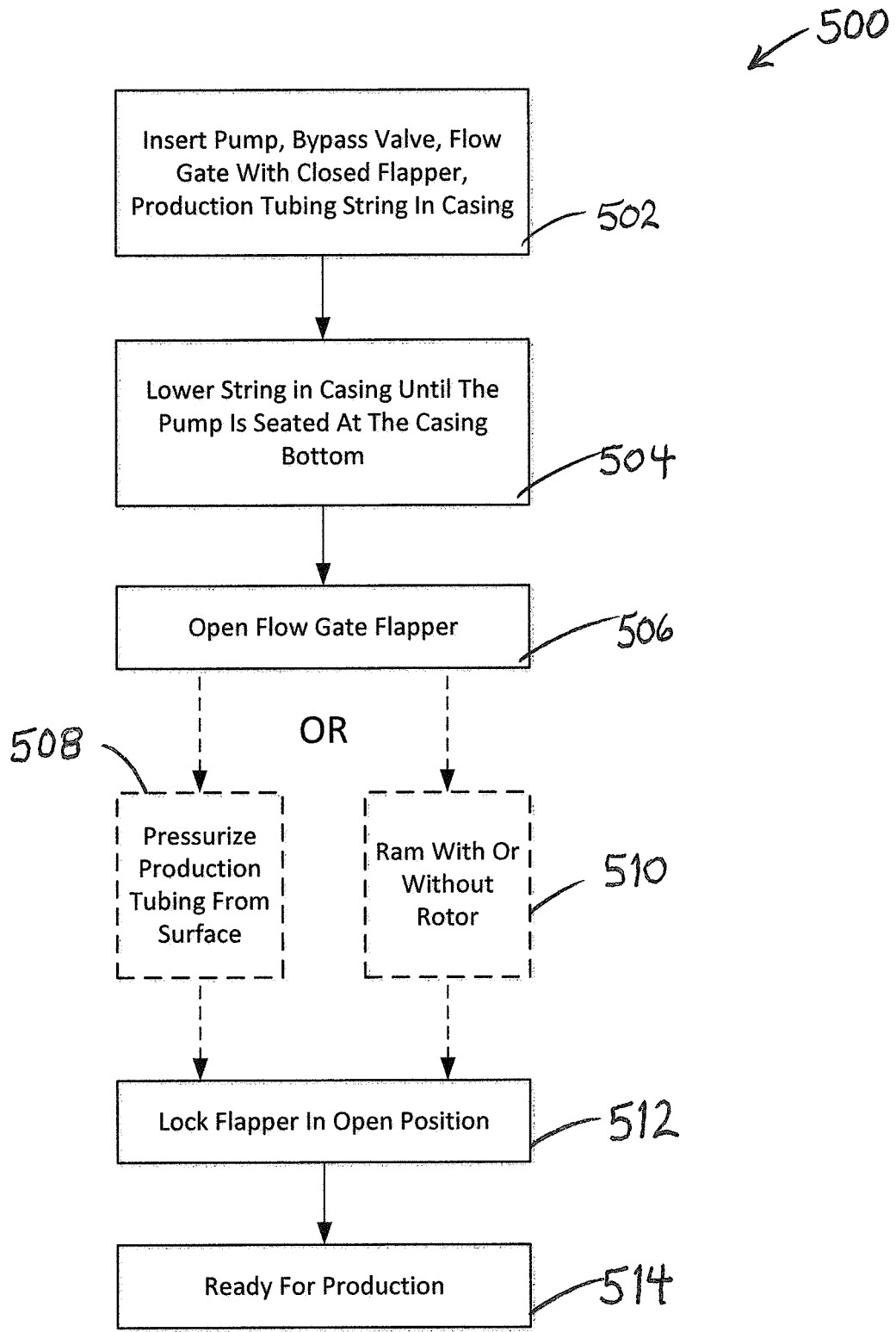

DUAL LOCK FLOW GATE

PRIORITY APPLICATION & INCORPORATION BY REFRENCE

This application is a Continuation In Part of U.S. Ser. No. 15/962,280 filed Apr. 25, 2018 and entitled Dual Lock Flow Gate. Each of the following patents are incorporated herein by references in their entireties and for all purposes: U.S. Pat. Nos. 8,545,190, 9,562,418, 9,027,654 and 9,759,041.

BACKGROUND OF THE INVENTION

Field of the Invention

The present invention relates to a system for managing a fluid flow. In particular, a valve such as a dual lock flow gate includes a flapper for blocking the valve, a means for fixing the flapper in a closed position and a means for fixing the flapper in an open position.

Discussion of the Related Art

Downhole production equipment includes production tubing reaching from a location near a subterranean reservoir to a surface location. When a pump is included in the production string, the pump rotor typically cannot be passed through valve(s) in order to reach the pump.

SUMMARY OF THE INVENTION

The present invention includes a dual lock flow gate intended for use in a flow management system.

In an embodiment, a dual lock flow gate (DLFG) comprises: a cylindrical flow gate body and a flapper at an end of the body; a notch in a body sidewall receiving a hinge part of the flapper; the flapper rotatably mounted via a pin that extends between a notch sidewall and the hinge part; at the flapper end of the body, a radial body hole and a shear pin extending from the hole; the shear pin interfering with the flapper such that flapper rotation away from a body through hole is inhibited; at a body end opposite the flapper end, a bore in the body sidewall providing access to the hinge part; and, a stepped plunger in the bore and a spring between the plunger and a plug inserted in the bore; wherein an end of the plunger enters a plunger receiving hole of the hinge part when the shear pin fails and releases the flapper to rotate so that the plunger and the receiving hole of the hinge part are aligned.

The embodiment above wherein the DLFG body is a substantially cylindrical body. The preceding embodiment wherein the radial body hole is threaded and the shear pin has mating threads. The preceding embodiment wherein the shear pin overhangs the flapper before the shear pin fails. In an embodiment, the shear pin is inserted in a flapper hole before the shear pin fails.

In an embodiment, a dual lock flow gate (DLFG) comprises: a body of a cylindrical flow gate and a cover at an end of the body; a shear pin interfering with the cover such that cover movement away from a body lip bounding a body through hole is inhibited; at a body end opposite the flapper end, a bore in the body sidewall providing access to the hinge part; and, a plunger in the bore, a spring acting on the plunger, and a spring rest in inserted in the bore; wherein an end of the plunger enters a plunger receiving hole of the cover when the shear pin fails and releases the cover such that the plunger and the receiving hole of the cover part are aligned.

In the preceding embodiment: a notch in a body sidewall for receiving a hinge part of the cover; the shear pin extending from a radial body hole; and, the cover rotatably mounted via a pin that extends between a notch sidewall and the hinge part. In the preceding embodiment the DLFG body is a substantially cylindrical body. In the preceding embodiment wherein the radial body hole is threaded and the shear pin has mating threads. In the preceding embodiment wherein the shear pin overhangs the flapper before the shear pin fails. In an embodiment wherein the shear pin is inserted in a flapper hole before the shear pin fails.

In an embodiment, a method of blocking a flow through a string during installation of the string in a casing and unblocking the flow when ready to produce flow through the string comprising the steps of: providing a dual lock flow gate (DLFG) above a pump and production tubing above the DLFG; during string installation, blocking a flow through the string by providing a DLFG flapper and a shear pin that interferes with flapper motion such that flapper rotation away from a body through hole is inhibited; after string installation and before production, unblocking a flow through the string by failing the shear pin and enabling flapper rotation away from the body through hole; and, when the flapper has rotated away from the body through hole, substantially preventing flapper rotation by inserting a plunger in the flapper; wherein the plunger is urged to extend from a DLFG body sidewall bore by a spring.

In the preceding embodiment, further comprising the step of providing a hinge part extending from the flapper. In the preceding embodiment, the step of providing a notch in a DLFG body sidewall for receiving the hinge part. In the preceding embodiment, the step of providing a DLFG body that is substantially cylindrical body. In the preceding embodiment, the step of providing radial body hole threads and shear pin threads that mate with the radial body hole threads. In the preceding embodiment, the step of overhanging the shear pin over the flapper before the shear pin fails. In an embodiment, the step of providing a flapper hole into which the shear pin is inserted before the shear pin fails.

BRIEF DESCRIPTION OF THE DRAWINGS

The present invention is described with reference to the accompanying figures. These figures, incorporated herein and forming part of the specification, illustrate the invention and, together with the description, further serve to explain its principles enabling a person skilled in the relevant art to make and use the invention.

FIGS. 1A-B show a production string including a dual lock flow gate in accordance with the present invention.

FIGS. 4A-D show an embodiment of the dual lock flow gate of FIG. 1A.

FIG. 5 shows steps which may be included during installation of the dual lock flow gate of FIG. 1A.

DETAILED DESCRIPTION OF THE PREFERRED EMBODIMENTS

Figure 2A:
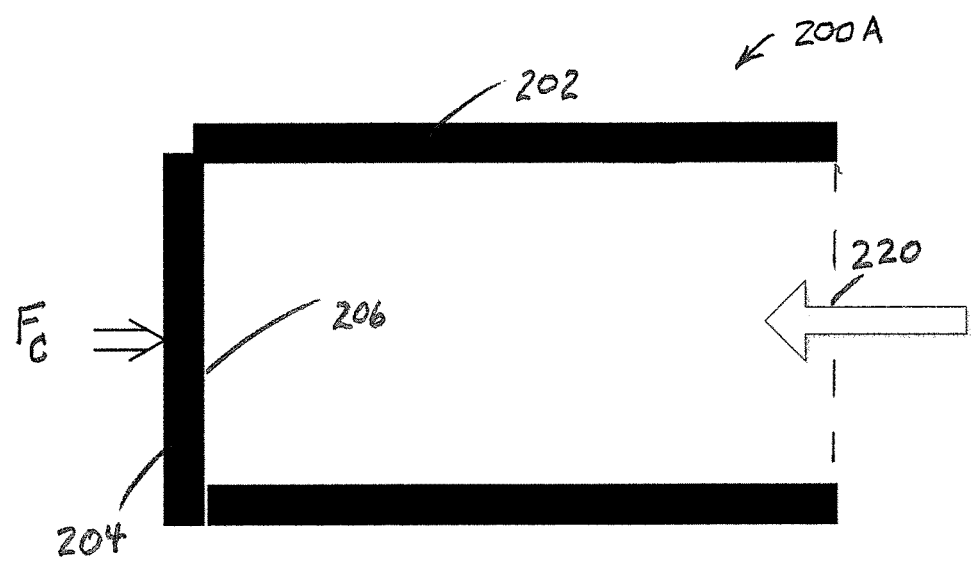
FIGS. 2A-B show an embodiment of the dual lock flow gate of FIG. 1A.

The disclosure provided in the following pages describes examples of some embodiments of the invention. The designs, figures, and description are non-limiting examples of certain embodiments of the invention. For example, other embodiments of the disclosed device may or may not include the features or all of the features described herein. Moreover, disclosed advantages and benefits may apply to only certain embodiments of the invention and should not be used to limit the disclosed invention.

To the extent parts, components and functions of the described invention exchange fluids, the associated interconnections and couplings may be direct or indirect unless explicitly described as being limited to one or the other. Notably, indirectly connected parts, components and functions may have interposed devices and/or functions known to persons of ordinary skill in the art.

Some embodiments of the invention have a flapper, lid, or cover held in place to cover or uncover a body through hole. Some DFLG bodies may be cylindrical or cylindrical but for ridges or flats on portions of the body.

For example, FIG. 1A shows an embodiment of the invention 100A in the form of a schematic diagram. A pump 104 takes suction from a reservoir 101 and pumped fluid is for passing through a bypass valve 108 having spill port 112 the valve being located between the pump and a dual lock flow gate ("DLFG") 120.

A pump 104 outlet 105 is connected to a bypass valve inlet 107, for example by a first spool 106. And, a bypass valve outlet 113 is connected to an inlet 117 of the dual lock flow gate 120, for example by a second spool 115. An outlet of the dual lock flow gate 123 leads to the surface, for example via production tubing 125.

In various embodiments, inlets, outlets, spools, and ports are one or more of a fitting, flange, pipe, or similar fluid conveyance.

FIG. 1B shows a section of a downhole production string 100B. The production string includes the bypass valve 108 interposed between the pump 104 and a DLFG 120. During normal operation, pumped fluid passes through the flow gate and into production tubing 204 where it is lifted to the surface.

In some embodiments, a casing 208 surrounds one or more of the tubing string, valve, and pump. Here, an annulus 206 is formed between the tubing string and the casing. A production flow is indicated by an arrow 102 while a backflow is indicated by an arrow 202. In various embodiments, the bypass valve serves to isolate backflows from one or more of the valve, portions of the valve, and the pump.

Figure 2B:
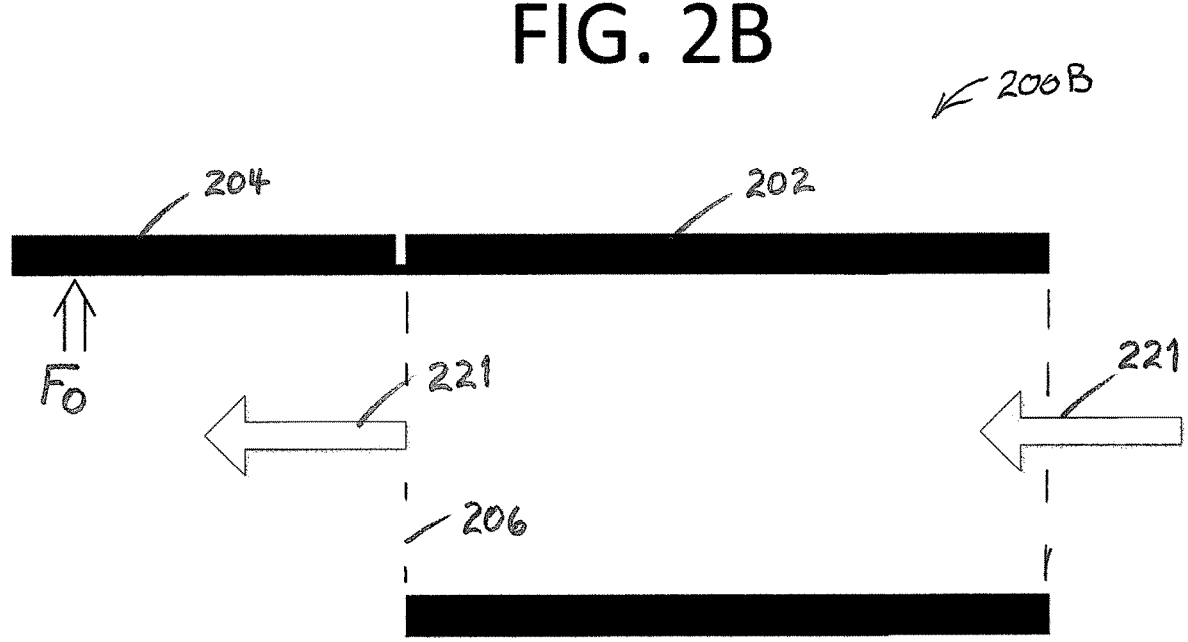

FIGS. 2A-B show a schematic of a dual lock flow gate ("DLFG") 200A-B. In FIG. 2A the DLFG is in the closed position. Here, a flapper 204 is held by a force Fc or by a similar flapper closed restraining force. This force holds the flapper in a closed position to block flow 220 through a dual lock flow gate body 202. For example, the force holds the flapper across a dual lock flow gate body opening 206 to block flow through the body. Other embodiments a cover or lid that may or may not rotate.

In FIG. 2B, the DLFG is in the open position. Here, the flapper 204 is held by a force Fo or by a similar flapper open restraining force. This force holds the flapper in an open position to allow flow 221 through the dual lock flow gate body. For example, the force holds the flapper away from a dual lock flow gate body opening 206 to allow flow through the body.

FIGS. 3A-F show an embodiment of a dual DLFG 300A-F similar to the device described above. FIG. 300A shows a flapper end view of a DLFG body. FIG. 300B shows a side view of the DLFG body. FIG. 300C shows a DLFG flapper. FIG. 300D shows a flapper end view of a DLFG body with the flapper installed. FIG. 300E shows a side view of the DLFG body with the flapper installed. FIG. 300F shows a side view of the DLFG body with the flapper installed and including a mechanism to lock the flapper in the open position.

Figure 3A:
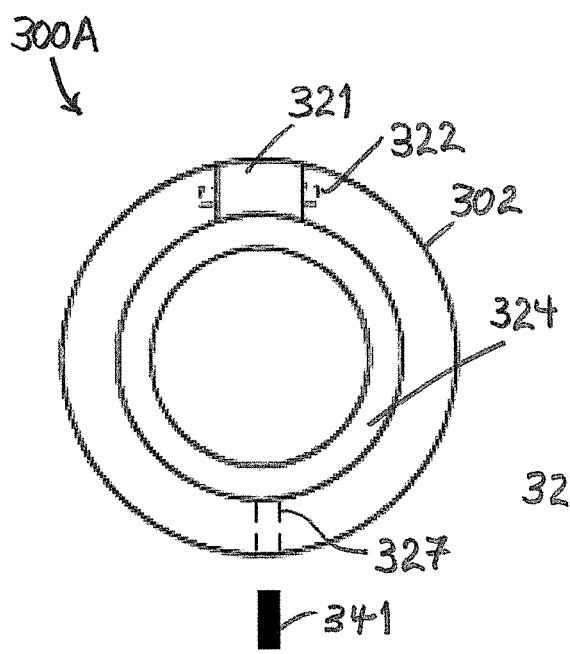
FIGS. 3A-F show an embodiment of the dual lock flow gate of FIG. 1A.
Figure 3B:
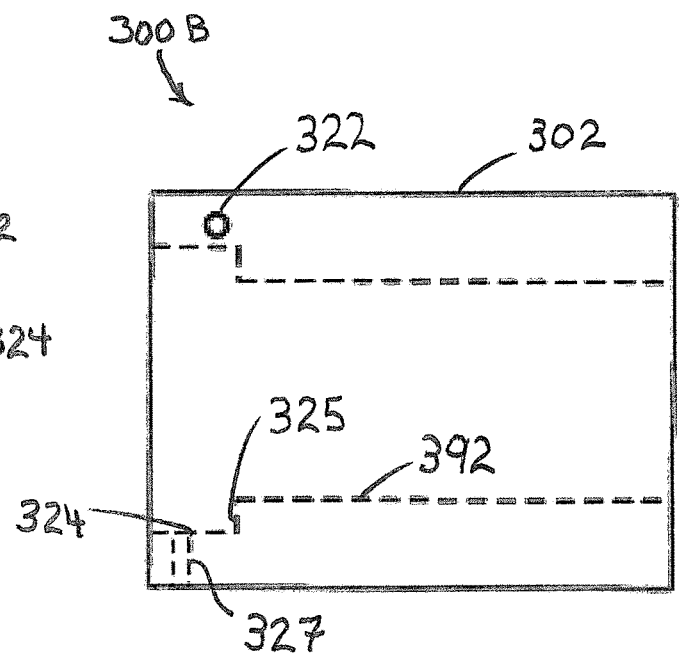
Figure 3C:
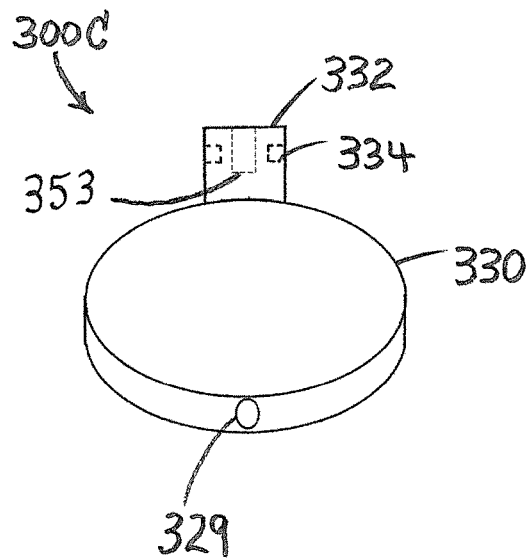

FIG. 3A-3C show a DLFG body 302 with a main bore 392 extending through the body and a counterbore 324 at one end of the body 300A-C. The counter bore is for receiving the flapper 330 and allowing the flapper to be seated against a lip 325 formed by the counterbore. As mentioned below, the flapper may rotate and, as seen here, a notch 321 in the body sidewall may provide a space for receiving a flapper hinge 332 that is fixed by pin(s) inserted in the body 322 and in the hinge 334.

The flapper 330 may be fixed in the closed position via means that hold the flapper against the lip 325. Flapper removal from the lip may be by flapper rotation. Here, the flapper fixture prevents rotation of the flapper with respect to the body 302.

Frangible or shear pins may be used to fix the flapper (or the lid) 330 in a closed position. For example, shear pins or screws such as threaded shear pin(s) 341 may be inserted in peripheral body hole(s) 327 such that the shear pin overhangs the flapper 330 and prevents the flapper from opening. In some embodiments the shear pin 341 may be inserted in a hole in the flapper periphery 329 (as shown).

Shear pin(s) 341 may be designed to shear/fail and to allow the flapper 330 to open when a sufficient force such as Fc acts on the flapper. One or multiple shear pins may be used and they may have equal or different shear values. In a three inch production string 1/4 20 sheer pins may be used and/or shear pins rated at 400 pounds may be used. For example, given a 1200 PSI force on the flapper, three shear pin(s) rated at 400 pounds or pounds per square inch may be used.

Figure 3D:
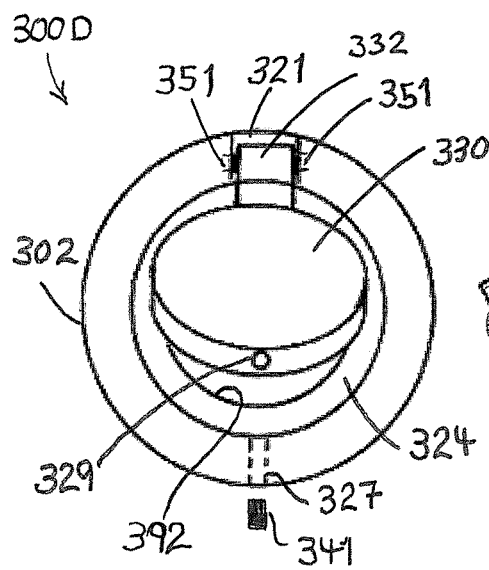
Figure 3E:
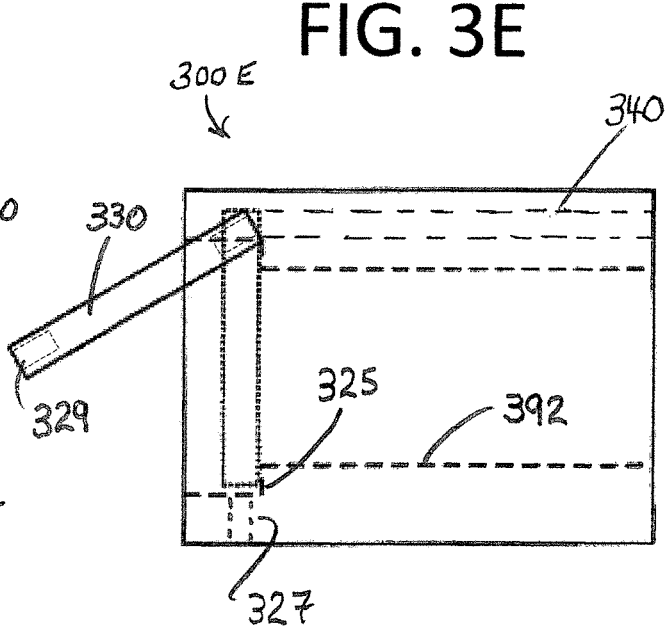
Figure 3F:
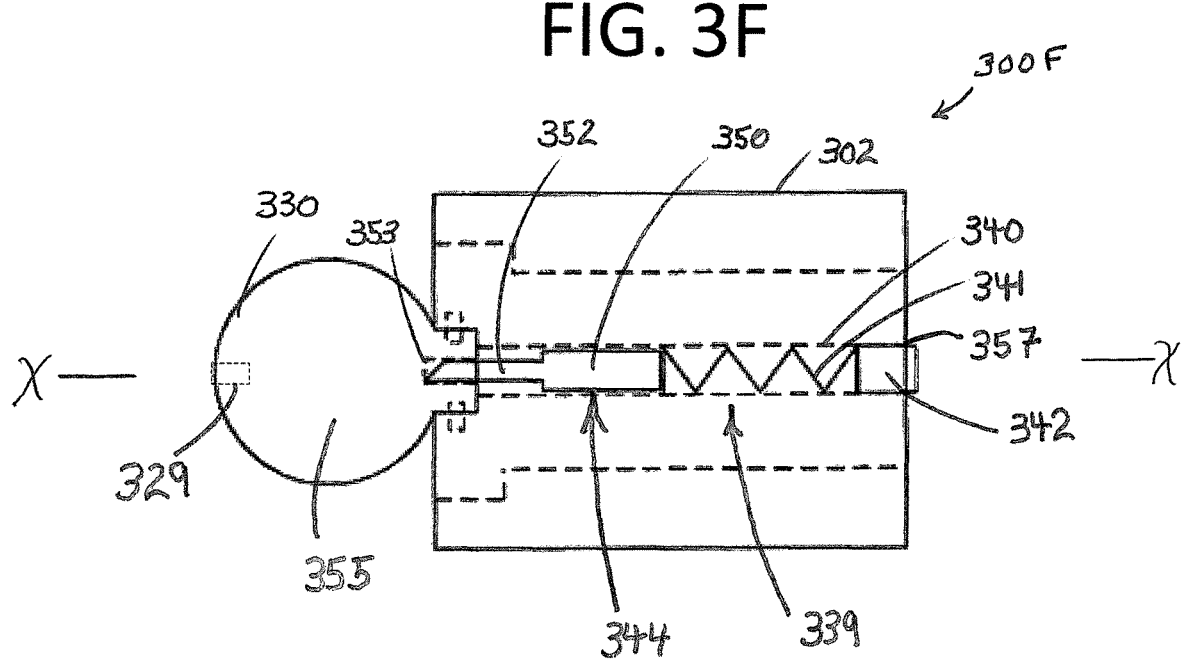

FIG. 3D-F show the DLFG body 302 with the flapper and a mechanism for fixing the flapper in the open position installed 300D-F.

FIG. 3D shows a flapper end view of a DLFG body 302 with the flapper installed 300D. The particular embodiment shown provides a flapper 330 with a hinge 332 inserted in a body notch 321, the flapper being rotatable about pins 351. As shown, the flapper is partially open to illustrate the flapper's swinging action. As mentioned, when the flapper 330 is closed, shear pin(s) 341 may be used to fix the flapper in place when it is pressed against the lip 325.

FIG. 3E shows a side view of the DLFG body 300E along with an eccentric cylindrical cutout 340 for housing a mechanism to hold the flapper open.

FIG. 3F shows a rotated side view of the DLFG body 300F. In this view the flapper 330 is fully opened and the back side of the flapper 355 is visible. The mechanism for holding the flapper open 339 operates in the cylindrical cutout 340.

The flapper open mechanism 339 includes a plunger 344 with a small diameter end 352 for insertion in a flapper hinge plunger hole 353. The small diameter end of the plunger is opposite a larger diameter end 350 of the plunger designed to slide in the cutout 340. A spring 341 is between the large diameter end of the plunger and a threaded plug 342 inserted in the cylindrical cutout mouth 357.

Operation of the flapper open mechanism 339 occurs when the flapper 330 is rotated to the open position. When the flapper is fully open, flapper hinge plunger hole 353 aligns with the small diameter end of the plunger 352 along the x-x axis. This alignment allows expansion of the spring 341 and insertion of the plunger small diameter end into the flapper hinge plunger hole which holds the flapper open. This insertion may be irreversible where there is no way to withdraw the plunger 344 from the flapper 330 short of removal of the DLFG from the production string and disassembly of the flapper open mechanism.

Figure 4B:
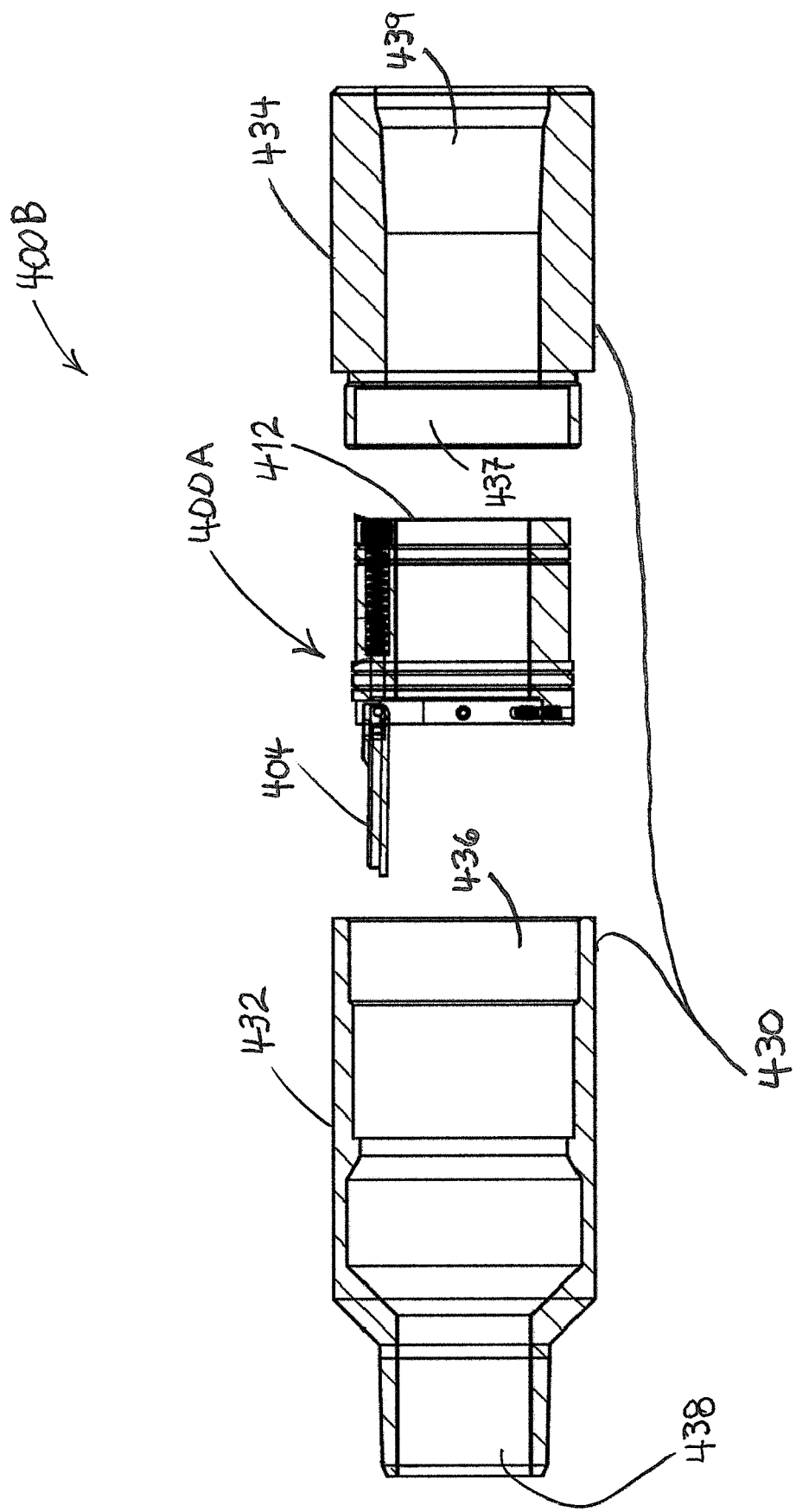
Figure 4C:
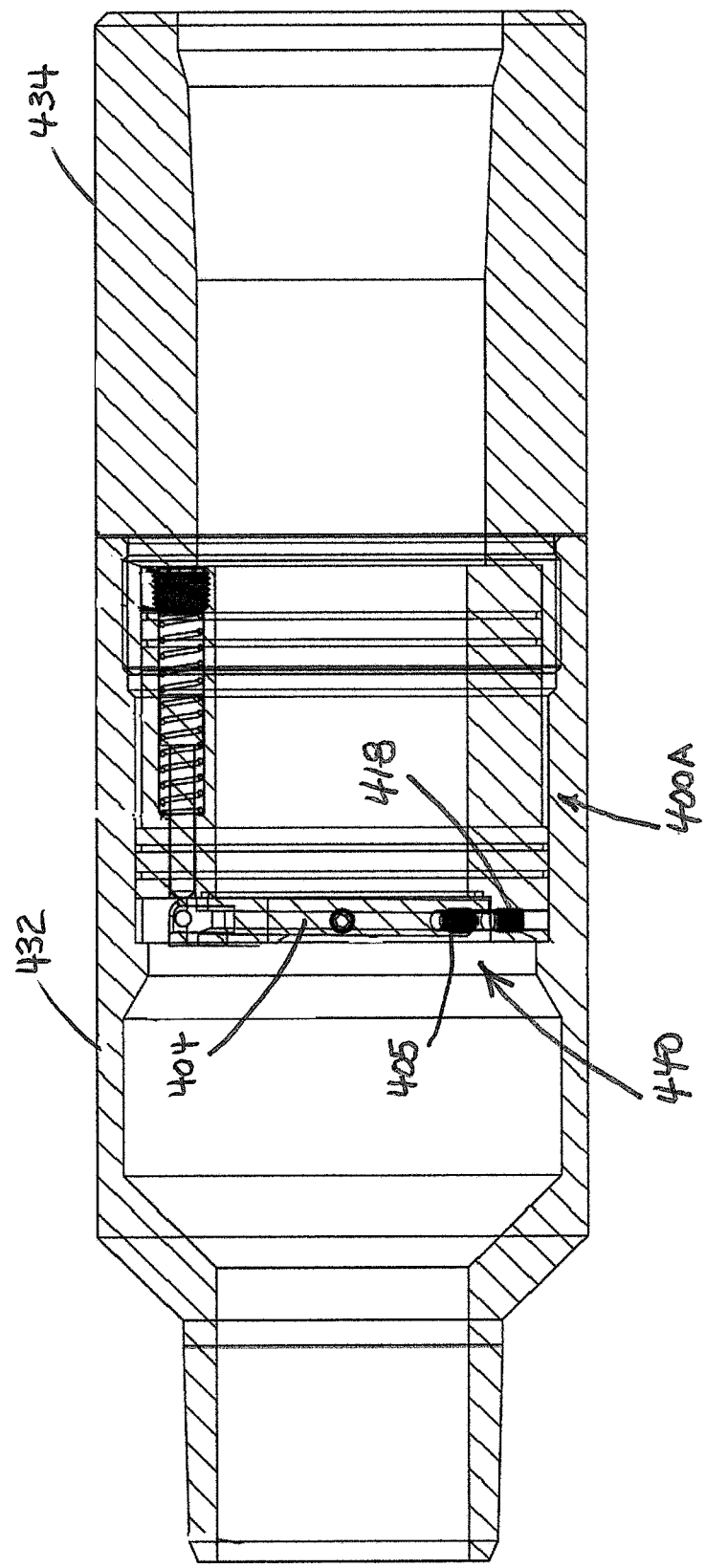
Figure 4D:
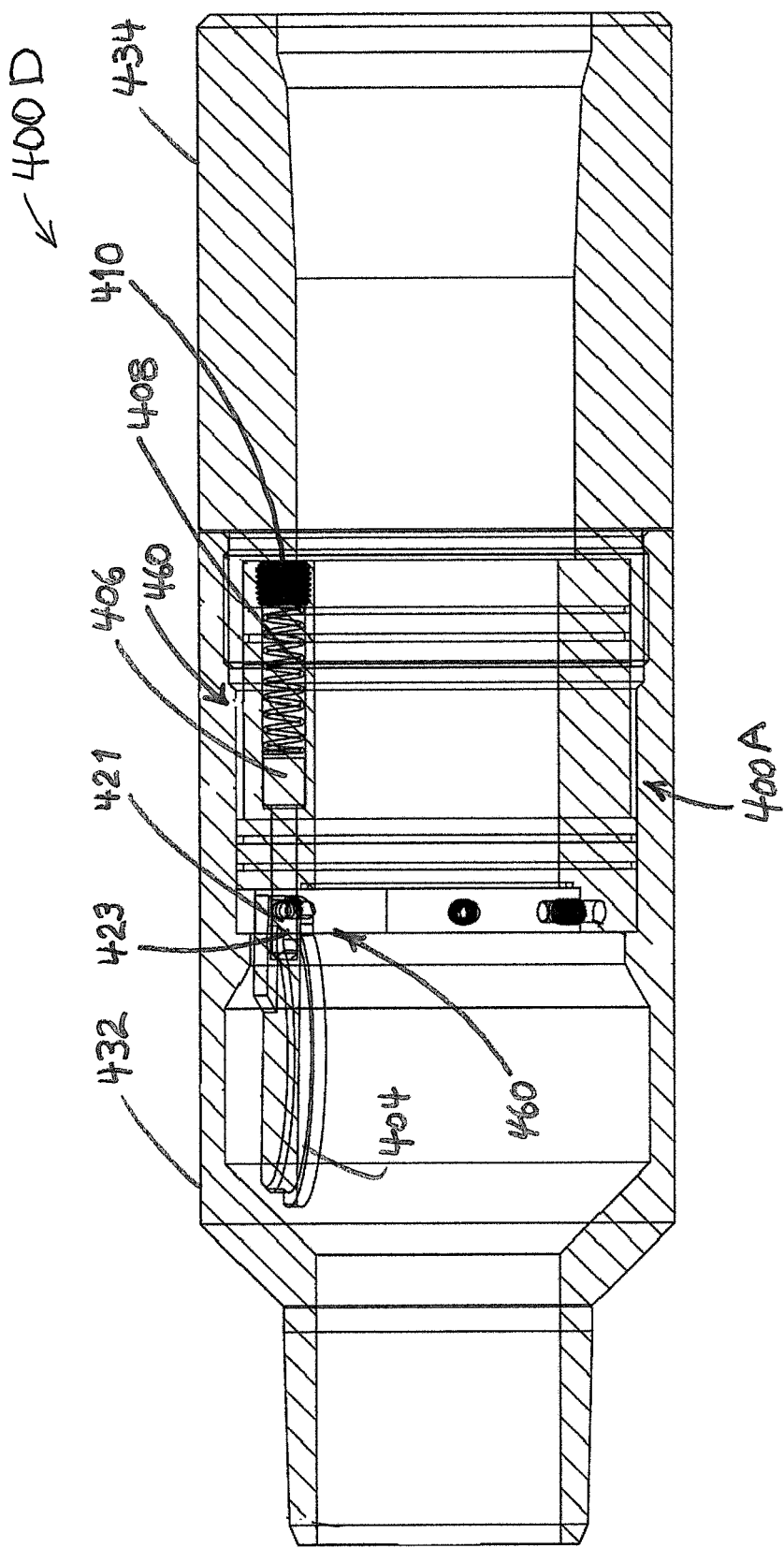

FIGS. 4A-D show an embodiment of a dual DLFG 400A-D similar to the devices described above. FIG. 4A shows an exploded view of a DLFG 400A. FIG. 4B shows a DLFG ready for insertion in a carrier 400B. FIG. 4C shows a DLFG in a carrier with a closed flapper 400C. FIG. 4D shows a DLFG in a carrier with an open flapper 400D.

In FIG. 4A, the exploded diagram shows a DLFG body 402 and a flapper 404 that is for articulation via a flapper hinge 409 and hinge pin or pins 407 that attach the flapper to the DLFG body.

A first locking device 440 (see FIG. 4C) is for fixing the flapper 404 in a closed position against an internal body lip 415. In this position the flapper blocks the body through hole 412. The first locking device includes a threaded shear pin(s) 405 inserted in hole(s) 416 in a perimeter of the body near the body end 414. When the flapper is closed against the internal lip 415 of the body, a shear pin end 418 interferes with or overhangs the flapper such that the flapper blocks the body through hole.

A second locking device 460 (see FIG. 4D) includes an eccentric bore in the body 419 that is parallel to a body centerline x-x. This bore provides access to a flapper hinge hole 421. A plunger 406 operating in the bore is urged by a spring 408 toward the flapper hinge hole. When the flapper hinge hole and the bore are aligned, the plunger tip 423 enters the flapper hinge hole and locks the flapper in the open position. In various embodiments a threaded plug 410 is inserted at an end of the bore 425 to provide a spring rest.

In FIG. 4B, the DLFG 400A is inserted 436/437 in a carrier 430 including a carrier pin end 432 and a carrier box end 434. During production operations, the pump forces flow entering the carrier pin end 438, into the DLFG open flapper end, and then out the carrier box end 439.

FIG. 4C shows the DLFG 400A with the flapper 404 in the closed and locked position. The flapper is locked by virtue of shear pin(s) preventing the flapper from opening. The flapper may be moved to the open position by ramming or by pressure such as pressure applied to the production tubing 204 at the surface. Ramming may be by a tool inserted in the production string, by a pump rod, or by a pump rotor during insertion of the rotor in a rod driven pump.

FIG. 4D shows the DLFG 400A with the flapper 404 in the open and locked position. The flapper is locked in the open position by the second locking device 460 which includes an end of the plunger 423 inserted in a flapper hinge hole.

FIG. 5 shows an operation of the DLFG 500. In a first step 502, a string including the pump, bypass valve, flow gate with closed flapper, and production tubing string is lowered downhole into the casing. In a second step 504 this string is lowered in the casing until the pump is seated at the bottom of the casing.

In a third step 506 the flow gate flapper 404 is opened. The first locking device 440 may be defeated and the flow gate opened by pressurization of the production tubing from the surface 508 which causes the shear pin(s) (e.g. 405) to fail. Alternatively, the flow gate may be opened by ramming 510 which also causes the shear pin(s) to fail. For example, a ramming tool may be used or the rod of a rod driven pump may be used. For example, a rod driven pump rod carrying a pump rotor may be used to ram the flapper open. Notably, where a rod driven pump rod carrying a pump rotor is used as a ram, this may result in the pump rotor passing through the DLFG 120. The pump rotor may also be passed through the bypass valve 108 before it is seated in the pump.

In a fourth step, the flapper (e.g. 404) is open and a second locking device fixes the flapper in place. Here, a plunger (e.g. 406/423) moves in a DLFG body sidewall bore (e.g. 419) and an end of the plunger (e.g. 423) is urged by a spring (e.g. 408) into a flapper hinge hole which fixes the flapper in the open position 512. In a subsequent step 514 the string is ready for production.

Figure 6:
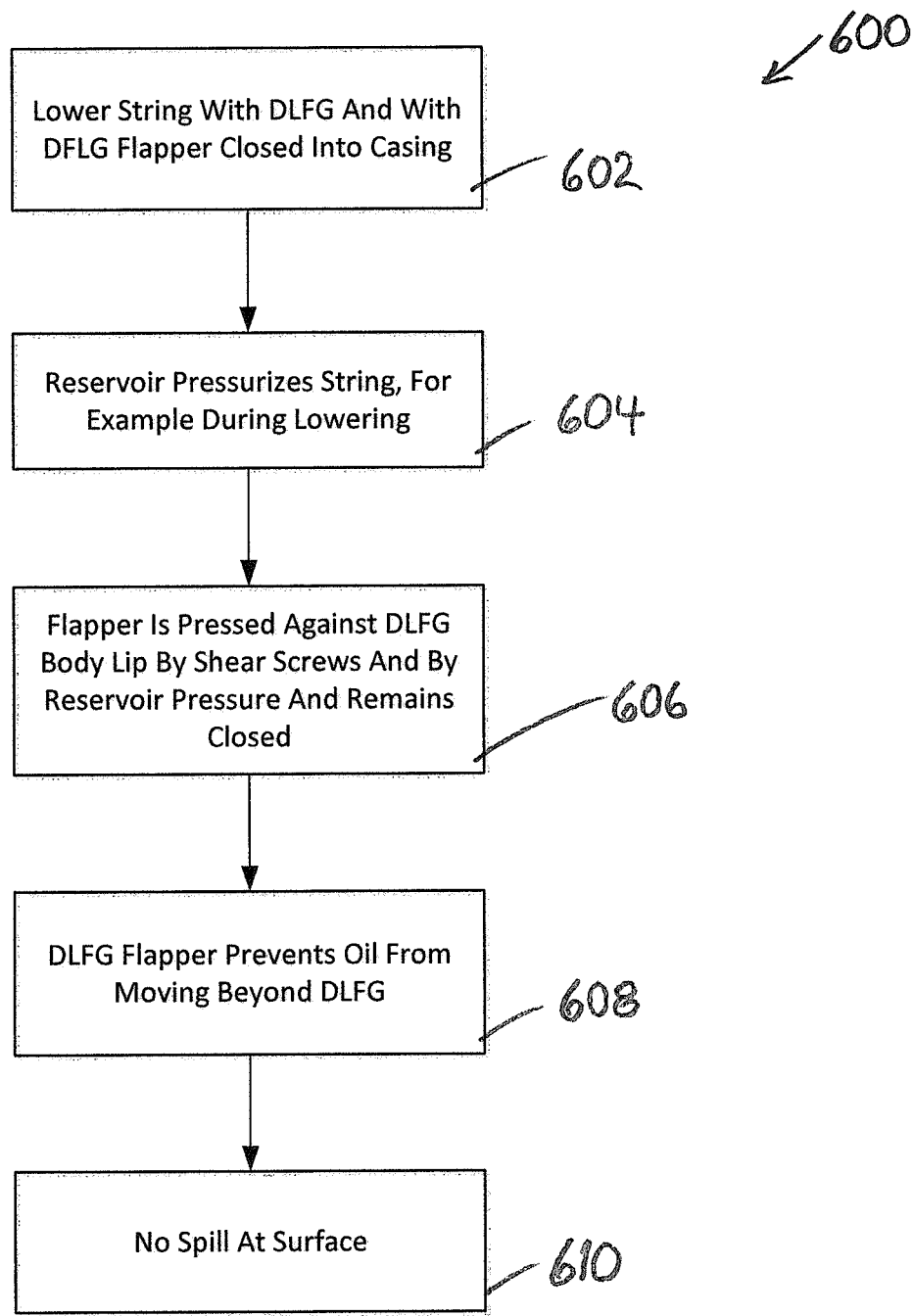
FIG. 6 shows a first spill avoidance operation by the dual lock flow gate of FIG. 1A.

FIG. 6 shows operation of the DLFG during a pressurized reservoir event 600. In a first step a string with a DLFG with a closed flapper is lowered into the casing 602. In a second step, the reservoir pressurizes the string, for example during the lowering operation 604. In a third step, the DLFG flapper is pressed against a DLFG body lip by shear pins and by reservoir pressure and so remains closed 606. In a fourth step, the DLFG flapper prevents oil from moving beyond the DLFG and toward the surface 608. In a fifth step, there is no oil spill at the surface due to the flapper being closed 610.

Figure 7:
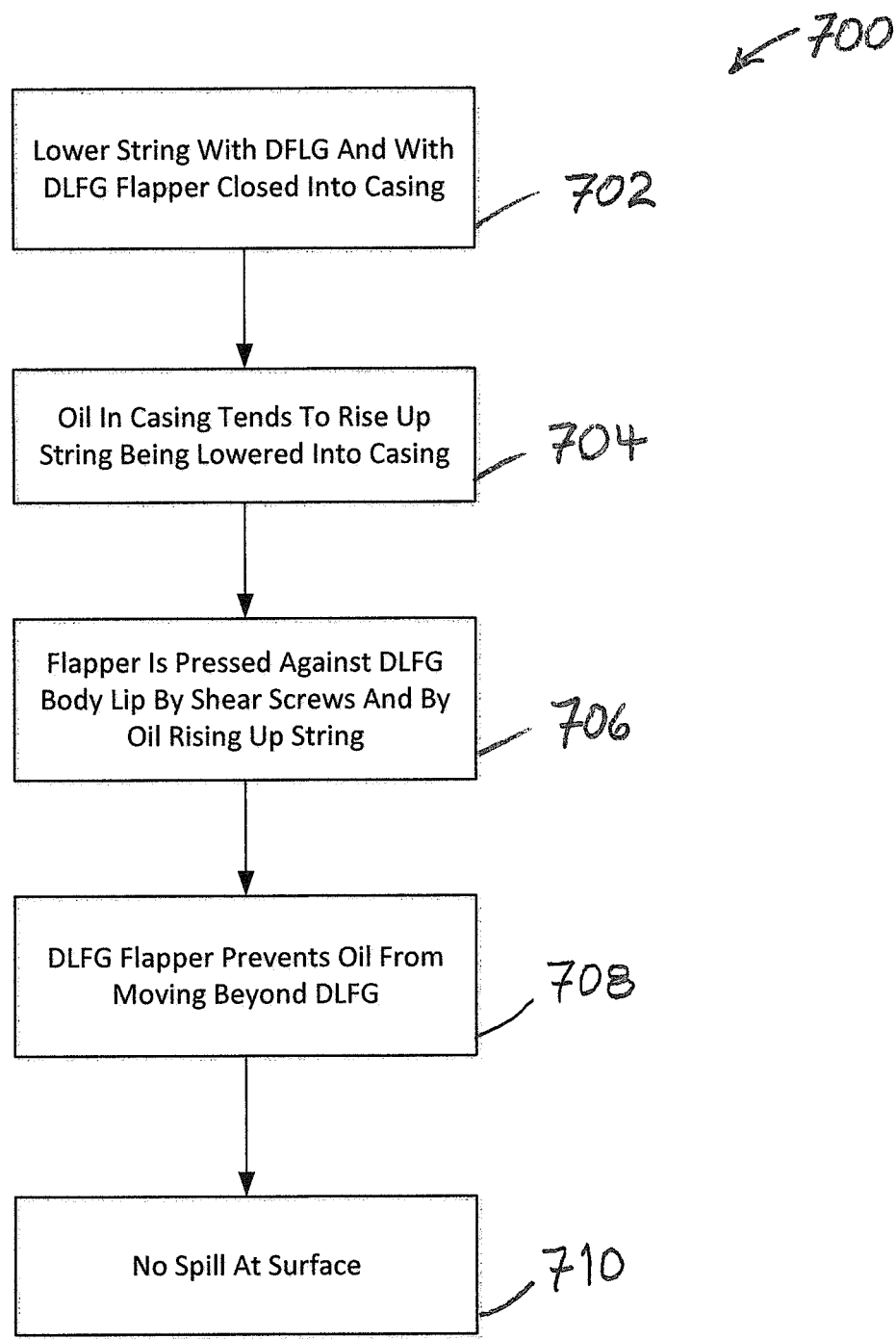
FIG. 7 shows a second spill avoidance operation by the dual lock flow gate of FIG. 1A.

FIG. 7 shows operation of the DLFG during lowering of a string into the casing 700. In a first step a string with a DLFG with a closed flapper is lowered into the casing 702. In a second step, oil in the casing tends to rise up into the string being lowered into the casing 704. In a third step, the DLFG flapper is pressed against a DLFG body lip by shear pins and by virtue of oil rising in the string 706. In a fourth step, the DLFG flapper prevents oil from moving beyond the DLFG and toward the surface 708. In a fifth step, there is no oil spill at the surface due to the flapper being closed 710.

In some cases, it may be desirable to use the DLFG to block flows through the production string that tend to cause pump rotation. For example, movement of the production string within a casing that is flooded or partially flooded may tend to cause pump rotation. Where electric submersible pumps (ESP's) are used, this pump rotation causes the pump motor to rotate which can generate an electric current. This creates a hazard where for example pump electrical leads or other pump parts expose persons to electrical discharges. Use of permanent magnet pump motors increases the likelihood and/or severity of electrical discharge hazards due for example to the high voltages that can be generated by permanent magnet pump motors as compared with other types of motors.

Spurious flows that cause pump motor rotation and create electrical hazards can be avoided by using a DLFG. The DLFG may be located as shown in FIG. 1A or FIG. 1B. Alternatively, the DLFG may be located anywhere in the production string so long as the flow that tends to spin the pump motor must pass through the DLFG.

An example, a spurious flow occurs when the production string is lowered into a flooded or partially flooded casing. When the production string enters liquid pooled in the casing, this liquid tends to continuously fill the production string as it is lowered into the casing. And, as the liquid flows within the production tubing and passes the pump rotor vanes, this tends to rotate the pump.

Consider now the use of a DLFG in the production tubing. The DLFG is initially closed and will not pass a flow. As such, movement of liquid in the production string is small if it occurs at all. For example, movement of liquid in the production string is due only to the compressibility of any air between the DLFG and the production tubing liquid entry point, for example 102. Rotation of the pump by liquid flowing through the production tubing is therefore small if it occurs at all.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A method of mitigating an electrical hazard comprising the steps of:
   providing a cased oil well that is flooded or partially flooded with oil prior to insertion of a production string into the casing;
   in the production string, providing a motorized pump followed by a bypass valve followed b a dual lock flow gate for producing oil from the well;
   the dual lock flow gate preventing oil flow in the production string only before pressurization of the production tubing from the surface or ramming;
   preventing rotation of the pump motor by preventing oil flow in the production string;
   preventing generation of an electric current by the pump motor by preventing rotation of the pump; and,
   mitigating an electrical hazard by preventing generation of the electric current.

2. The method of claim 1 further comprising the step of:
   providing a dual lock flow gate flapper with a first lock that holds the flapper closed during lowering of the production string.

3. The method of claim 2 further comprising the step of:
   providing a second lock that holds the flapper permanently open after lowering of the production string.

4. A method of mitigating an electrical hazard comprising the steps of:
   providing a well for producing oil that is flooded or partially flooded;
   providing a motorized rotary pump for producing the well;
   providing a dual lock flow gate in a production string above the pump;
   the dual lock flow gate preventing oil flow in the production string only before pressurization of the production tubing from the surface or ramming;
   preventing rotation of the pump motor by preventing oil flow in the production string;
   preventing generation of an electric current by the pump motor by preventing rotation of the pump; and,
   mitigating an electrical hazard by preventing generation of the electric current.

5. The method of claim 4 further comprising the step of:
   providing a dual lock flow gate flapper with a first lock that holds the flapper closed during lowering of the production string.

6. The method of claim 5 further comprising the step of:
   providing a second lock that holds the flapper open after lowering of the production string.

7. An oil well preproduction and production method comprising the steps of:
   providing a pump for taking suction from an oil reservoir and for pumping oil through a dual lock flow gate;
   holding a dual lock flow gate flapper closed when the production string is being lowered into the oil well; and,
   permanently holding the dual lock flow gate flapper open after oil is first produced from the oil well;
   wherein the dual lock flow gate flapper is held permanently open by a spring urged pin that is inserted into a flapper hinge, the spring enclosed within a bore in a sidewall of the dual lock flow gate.

* * * * *